United States Patent
Feijoo et al.

(10) Patent No.: US 10,540,216 B2
(45) Date of Patent: Jan. 21, 2020

(54) NORMALIZING CLOUD RESOURCE INTERACTION FOR A SUITE OF MULTI-TENANT PRODUCTS ACROSS DISPARATE OBJECTS AND ACTIONS COMING FROM DIFFERENT CLOUD SERVICES

(71) Applicant: Citrix Systems, Inc., Fort Lauderdale, FL (US)

(72) Inventors: Ricardo F. Feijoo, Fort Lauderdale, FL (US); Thomas Kludy, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 56 days.

(21) Appl. No.: 15/650,137

(22) Filed: Jul. 14, 2017

(65) Prior Publication Data
US 2019/0018717 A1 Jan. 17, 2019

(51) Int. Cl.
| | |
|---|---|
| G06F 3/00 | (2006.01) |
| G06F 9/54 | (2006.01) |
| H04L 29/08 | (2006.01) |
| G06F 3/0481 | (2013.01) |
| G06F 3/0484 | (2013.01) |
| G06F 3/048 | (2013.01) |
| G06F 3/0482 | (2013.01) |

(52) U.S. Cl.
CPC .............. *G06F 9/543* (2013.01); *G06F 3/048* (2013.01); *G06F 3/0481* (2013.01); *G06F 3/0482* (2013.01); *G06F 3/0484* (2013.01); *G06F 9/547* (2013.01); *H04L 67/10* (2013.01)

(58) Field of Classification Search
CPC ...... G06F 3/048; G06F 3/0481; G06F 3/0482; G06F 3/0484
See application file for complete search history.

(56) References Cited

U.S. PATENT DOCUMENTS 9,092,958 B2 * 7/2015 Brueggen .............. G08B 19/00
9,185,021 B1 * 11/2015 Ramnathkar ....... H04L 12/6418
(Continued)

*Primary Examiner* — Kieu D Vu
*Assistant Examiner* — Andrew Chung
(74) *Attorney, Agent, or Firm* — Fox Rothschild LLP; Robert J. Sacco; Carol E. Thorstad-Forsyth

(57) ABSTRACT

Systems and methods for normalizing cloud resource interactions across disparate objects and actions provided by a plurality of different cloud services. The methods comprise: obtaining information that identifies the objects and indicates what actions can be performed for the objects; processing the information to consolidate at least two of the actions supported by different ones of the objects into a single action; causing a unified view to be presented in a User Interface ("UI") that allows an initiation of the single action whereby the at least two actions supported by different ones of the objects are concurrently selected; receiving a standardized command for initiating the single action; transforming a first protocol format of the standardized command into a second different protocol format to generate at least one non-standardized command; and using the non-standardized command to cause performance of the at least two actions by said different ones of the objects.

12 Claims, 11 Drawing Sheets

(56) References Cited

U.S. PATENT DOCUMENTS

| | | | | |
|---|---|---|---|---|
| 2006/0036949 A1* | 2/2006 | Moore | G06F 3/0482 | 715/730 |
| 2010/0064349 A1* | 3/2010 | Randle | H04L 63/08 | 726/4 |
| 2010/0161101 A1* | 6/2010 | Pouyez | G06Q 10/10 | 700/108 |
| 2012/0059742 A1* | 3/2012 | Katzin | G06Q 30/06 | 705/27.1 |
| 2014/0149794 A1* | 5/2014 | Shetty | H04L 67/1095 | 714/20 |
| 2014/0157134 A1* | 6/2014 | Kleinberger | G06F 3/0484 | 715/738 |
| 2014/0208199 A1* | 7/2014 | Peleg | G06O 30/0277 | 715/234 |
| 2014/0282037 A1* | 9/2014 | Narasimhan | G06Q 30/0631 | 715/738 |
| 2015/0095796 A1* | 4/2015 | Kutz | G06F 3/0486 | 715/748 |
| 2015/0205808 A1* | 7/2015 | Chakra | G06F 17/3089 | 715/205 |
| 2016/0062668 A1* | 3/2016 | Park | G06F 3/04842 | 715/771 |
| 2016/0350551 A1* | 12/2016 | Chang | G06F 12/1408 | |
| 2017/0262443 A1* | 9/2017 | Cho | G06F 16/192 | |
| 2018/0198947 A1* | 7/2018 | Nuggehalli | H04N 1/32502 | |

* cited by examiner

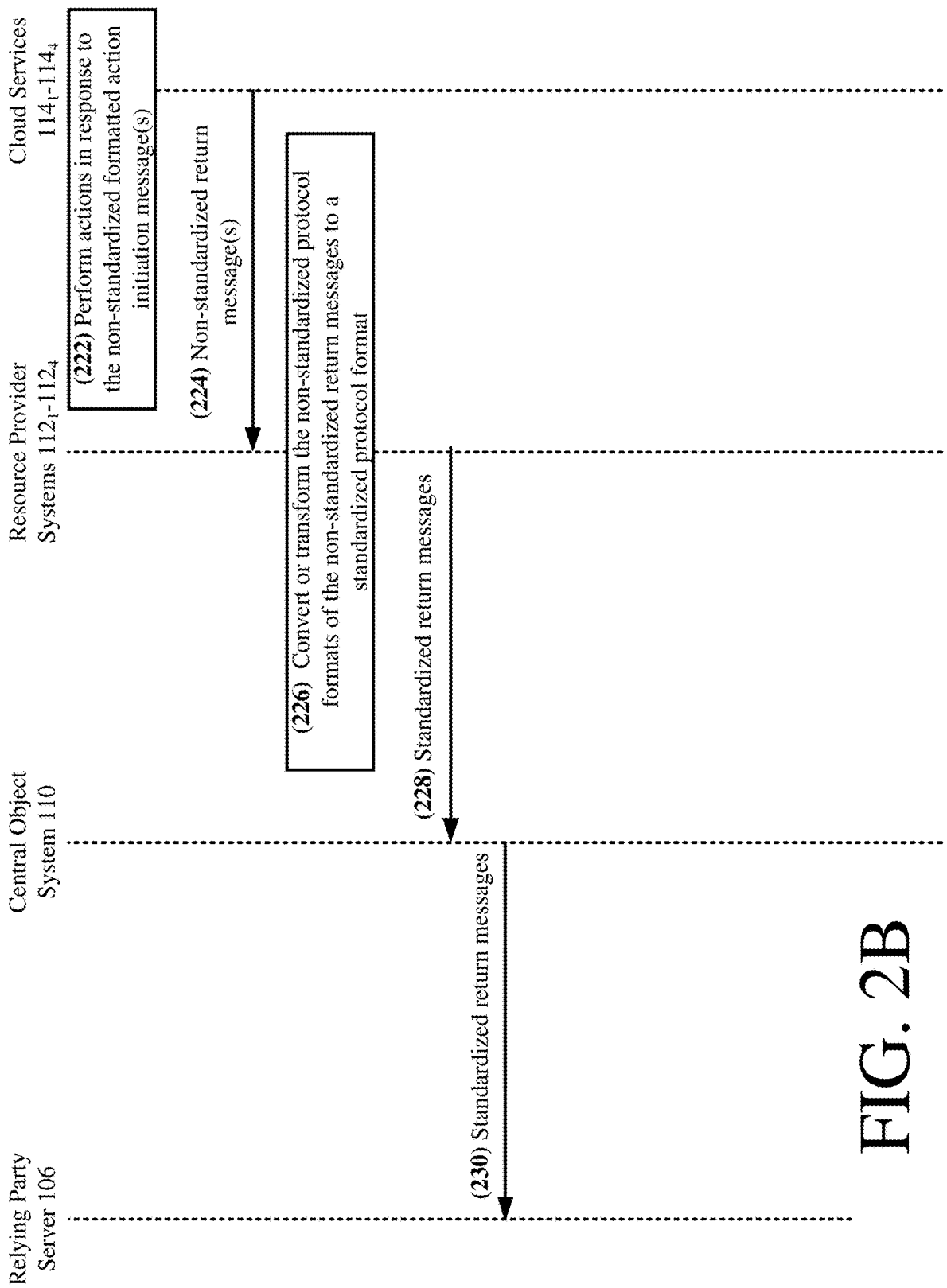

NORMALIZING CLOUD RESOURCE INTERACTION FOR A SUITE OF MULTI-TENANT PRODUCTS ACROSS DISPARATE OBJECTS AND ACTIONS COMING FROM DIFFERENT CLOUD SERVICES

BACKGROUND

Statement of the Technical Field

The present disclosure relates generally to computing systems. More particularly, the present disclosure relates to implementing systems and methods for normalizing cloud resource interaction for a suite of multi-tenant products across disparate objects and actions coming from different cloud services.

Description of the Related Art

A barrier to providing a unified experience for managing resources across disparate cloud services is the fact that each cloud service is not worried about how another cloud service would want to act on a resource as well as any new combined actions that may be desired. Because of this, individual experiences are provided across cloud services and administrators are made to figure out how actions are or are not related to each other.

SUMMARY

The present disclosure concerns implementing systems and methods for normalizing cloud resource interactions across disparate objects and actions provided by a plurality of different cloud services. The methods comprise: obtaining, by a computing device, information that identifies the objects and indicates what actions can be performed for the objects; processing, by the computing device, the information to consolidate at least two actions of the actions supported by different ones of the objects into a single action; causing, by the computing device, a unified view to be presented in a User Interface ("UI") that allows an initiation of the single action whereby the at least two actions supported by different ones of the objects are concurrently selected; receiving, by the computing device, a standardized message for initiating the single action; transforming a first protocol format of the standardized message into a second different protocol format to generate at least one non-standardized message; and using the non-standardized message to cause performance of the at least two actions by said different ones of the objects.

In some scenarios, the actions are handled through Application Programming Interface ("API") calls. In those or other scenarios, the UI is accessed via a web browser redirect to a resource of a remote system or is loaded inside of a web browser. Additionally or alternatively, the UI may include a lightbox in which a web component is rendered.

In those or other scenarios, the different ones of the objects are provided by a single cloud service or are respectively provided by at least two cloud services. The at least two actions are consolidated into a single action when the at least two actions are multiselectable actions.

BRIEF DESCRIPTION OF THE DRAWINGS

The present solution will be described with reference to the following drawing figures, in which like numerals represent like items throughout the figures.

FIGS. 2A-2B (collectively referred to as "FIG. 2") is an illustration an illustrative message flow that is useful for understanding the operations of the system shown in FIG. 1.

DETAILED DESCRIPTION

Figure 1:
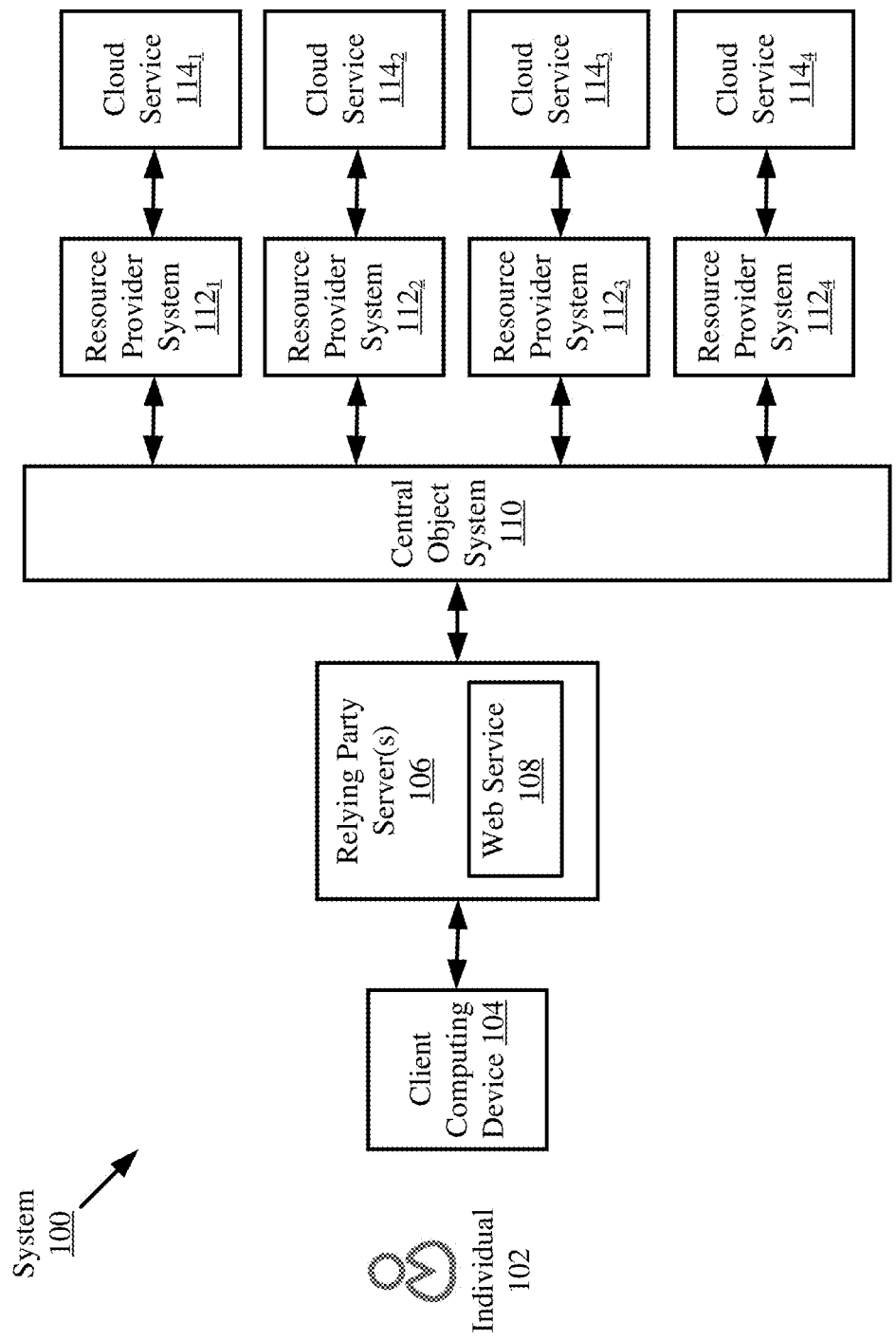
FIG. 1 is an illustration of an exemplary system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution relates to systems and methods for normalizing cloud resource interaction for a suite of multi-tenant products across disparate objects and actions coming from different cloud services. The present solution does not force separation of resources due to the fact they are coming from different cloud services. The present solution allows cloud services to provide custom actions on an object that can be separately implemented and called centrally.

Referring now to FIG. 1, there is provided a schematic illustration of an exemplary system 100. System 100 leverages a central object system 110 that integrates with each new cloud service and normalizes cloud resource interactions across disparate objects and actions coming from different cloud services. The term "cloud service", as used herein, refers to any service made available to users on demand via the Internet from a remote resource provider system (e.g., a server). Illustrative cloud services include, but are not limited to, email, electronic calendars, electronic contacts, electronic maps, online storage, and/or online data backup. The term "object", as used herein, refers to a variable, a data structure, a function, and/or combinations thereof. For example, an object is a software application, such as a Windows® software application or a mobile application. The term "action", as used herein, refers to a task to be performed by hardware and/or software. The tasks can be initiated by: an individual 102 interacting with the software by way of a client computing device 104 or server 106; a hardware component (e.g., a timer); and/or software defined triggers. The tasks include, but are not limited to, file creation, file deletion, access to a resource, a memory read, a memory write, change a name, add to a group, delete from group, delete user, and/or copy.

As shown in FIG. 1, system 100 comprises a plurality of disparate cloud services $114_1$, $114_2$, $114_3$, $114_4$. The plurality of disparate cloud services $114_1$-$114_4$ use a web service 108 for connections with a client computing device 104. The web service 108 is provided by relying party server(s) 106, and can be accessed by an individual 102 using a web browser running on the client computing device 104. Client computing devices, relying party servers, web browsers and web services are well known in the art, and therefore will not be described in detail herein. Any known or to be known client computing devices, relying party servers, web browsers and/or web services can be used herein without limitation. In some scenarios, the client computing device includes, but is not limited to, a personal computer, a laptop computer, a personal digital assistant, or a smart phone. The web browser includes, but is not limited to, Firefox, Internet Explorer, Safari, or Google Chrome. The web service includes, but is not limited to, Citrix XenApp or XenDesktop service.

The plurality of cloud services $114_1$, $114_2$, $114_3$, $114_4$ each have their own objects which need to be managed in similar ways and in unique ways. The central object system 110 unifies a model of how one interacts with the objects by allowing (a) the objects with similar actions to be worked on in a similar manner and (b) the objects with different individual actions to be defined as custom actions and worked on in unique manners. For example, a first cloud service $114_1$ is providing an object which is a Windows® application, and a second cloud service $114_2$ is providing an object which is a mobile application. Common actions between the Windows® application and the mobile application are: add a user to a group; change a user name; assign to a user; copy a user profile; and/or delete a user. A custom action for the Windows® application is to update a policy that is specific to the Windows® application. A custom action for the mobile application is wrapping the software application. The common and custom actions are communicated from the disparate cloud services $114_1$, $114_2$ to the central object system 110. The central object system 110 then provides a single view of the different cloud services and actions that they support. This single view comprises one unified view that crosses cloud services. The present solution is not limited to the particulars of this example.

Figure 2A:
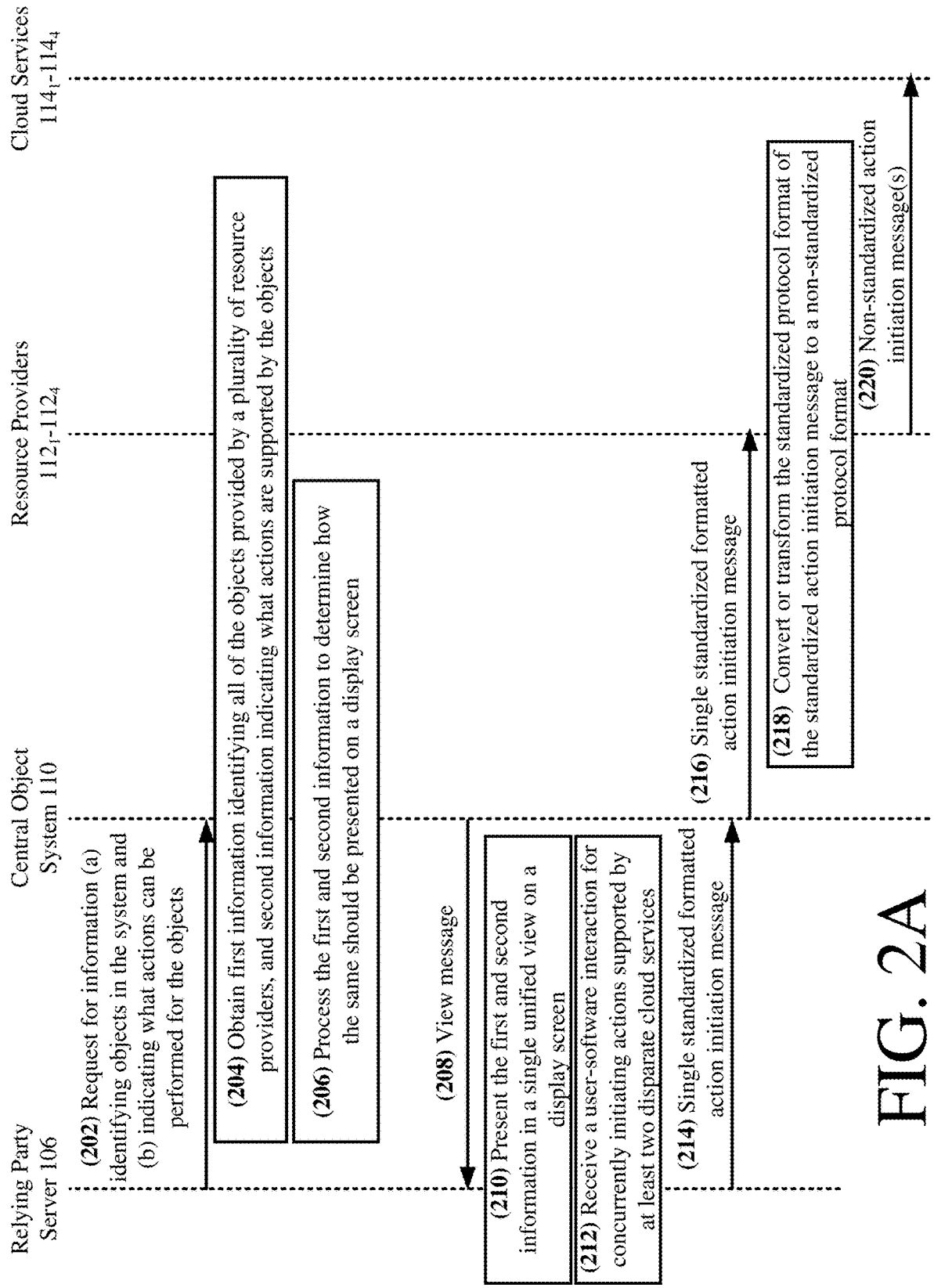

Referring now to FIGS. 2A-2B, there is provided a message flow diagram that is useful for understanding the operations of system 100. In some scenarios, the messages communicated between the relying party server 106, central object system 100 and resource providers $112_1$-$112_4$ are encapsulated in accordance with a Hypertext Transfer Protocol ("HTTP"). The messages communicated between the resource providers $112_1$-$112_4$ and cloud services $114_1$-$114_4$ are encapsulated in accordance with the HTTP, XML Remote Procedure Calls ("RPC"), Simple Object Access Protocol ("SOAP"), Common Object Requesting Broker Architecture ("CORBA"), and/or Tabular Data Streams ("TDS"). The present solution is not limited in this regard. It should be noted that the terms "standardized format" and "non-standardized format" refer to the format of the messages (i.e., what information is included in the messages and how such information is arranged), and not the manner in which the messages are encapsulated.

As shown by 202 of FIG. 2A, a relying party server 106 requests information from the central object system 110 that (a) identifies objects in the system 100 and (b) indicates what actions can be performed via those objects. Notably, in some scenarios, the request includes an information request message encapsulated in a header and/or a trailer in accordance with HTTP. The information request message is in a standardized format. An illustrative information request message in the standardized format is shown below.

```
POST https://rp.com/acme/offeringactions HTTP/1.1
Authorization: CWSAuth
Bearer=xyz,service=abc
Content-Type: application/json
Accept: application/json
X-CC-Locale: en-US
X-Cws-TransactionId: 8b6a2702-bd70-4c1d-
ad33-4b261a8c9227
{
  "Offerings": [{
    "ResourceProvider": "MyService",
    "Id": "abc"
```

```
    }, {
        "ResourceProvider": "MyService",
        "Id": "123"
    }]
}
```

The present solution is not limited to the particulars of this example.

In response to the request, the central object system 110 obtains first information identifying the objects provided by the plurality of resource provider systems $112_1$, $112_2$, $112_3$, $112_4$, as shown by 204. The central object system 110 also obtains second information indicating what actions are supported by the objects. Notably, the first and second information is obtained by: communicating the information request message in a standardized format from the central object system 110 to the resource provider(s) $112_1$-$112_4$; performing operations by the resource provider(s) $112_1$-$112_4$ to translate the standardized format of the information request message to at least one non-standardized format; communicating the non-standardized formatted information request message(s) to the cloud service(s) $114_1$-$114_4$; performing operations by the cloud service(s) $114_1$-$114_4$ to obtain the first and second information; generating by the cloud service(s) $114_1$-$114_4$ an information response message in a non-standardized format; and communicating the non-standardized formatted information response message to the resource provider(s) $112_1$-$112_4$.

In some scenarios, the non-standardized format of the information request message is a hardcoded list of actions inside the resource provider, that are simply known to work for the objects returned from the resource provider. An illustrative information response message in a non-standardized format is shown below.
actions=[{name: "Delete this app", type: "API", callback: "https://service1.com/delete", multiselectable: true, require-confirmation: true}]
The present solution is not limited to the particulars of this example.

In 206, the first and second information is processed to determine how it should be presented on a display screen of the relying party server 106 or client computing device 104. In this regard, the relying party server 106 may convert the information response message from a non-standardized format to a standardized format, and communicate the same to the central object system 110. An illustrative information response message in the standardized format is shown below.

```
HTTP/1.1 200 OK
Content-Type: application/json
{
    "Count": 3,
    "Total": 3,
    "Items": [
        {
            "Id": "BuiltIn:ManageUsers"
        },
        {
            "Id": "BuiltIn:Delete",
            "ApiUrl":
"https://rp.com/acme/offerings/$delete",
            "ApiMethod": "POST"
        },
        {
            "Id": "MyService:MyAction",
            "Name": "Do neat stuff",
```

```
            "InvokeType": "Api",
            "RequiresConfirmation": false,
            "ApiUrl":
"https://service.ctxwsdev.net/acme/dostuff",
            "ApiMethod": "PUT",
            "UiUrl":
"https://service.cloud.com/dostuff"
        }
    ]
}
```

The present solution is not limited to the particulars of this example.

The central object system 110 may: process the information contained in the information response message to consolidate at least two actions supported by different objects into a single action; and generate a view message to cause a unified view to be presented in a User Interface ("UI") that allows an initiation of the single action whereby the at least two actions supported by the different objects are concurrently selected. The view message is then sent in 208 from the central object system 110 to the relaying party server 106. Notably, the view message is in a standardized format and comprises a standard web page. In some scenarios, objects from each service are represented as tiles. The actions appear under a menu available on each tile, or in an action pane when the tiles are multi-selected. The present solution is not limited to the particulars of this example.

Figure 3:
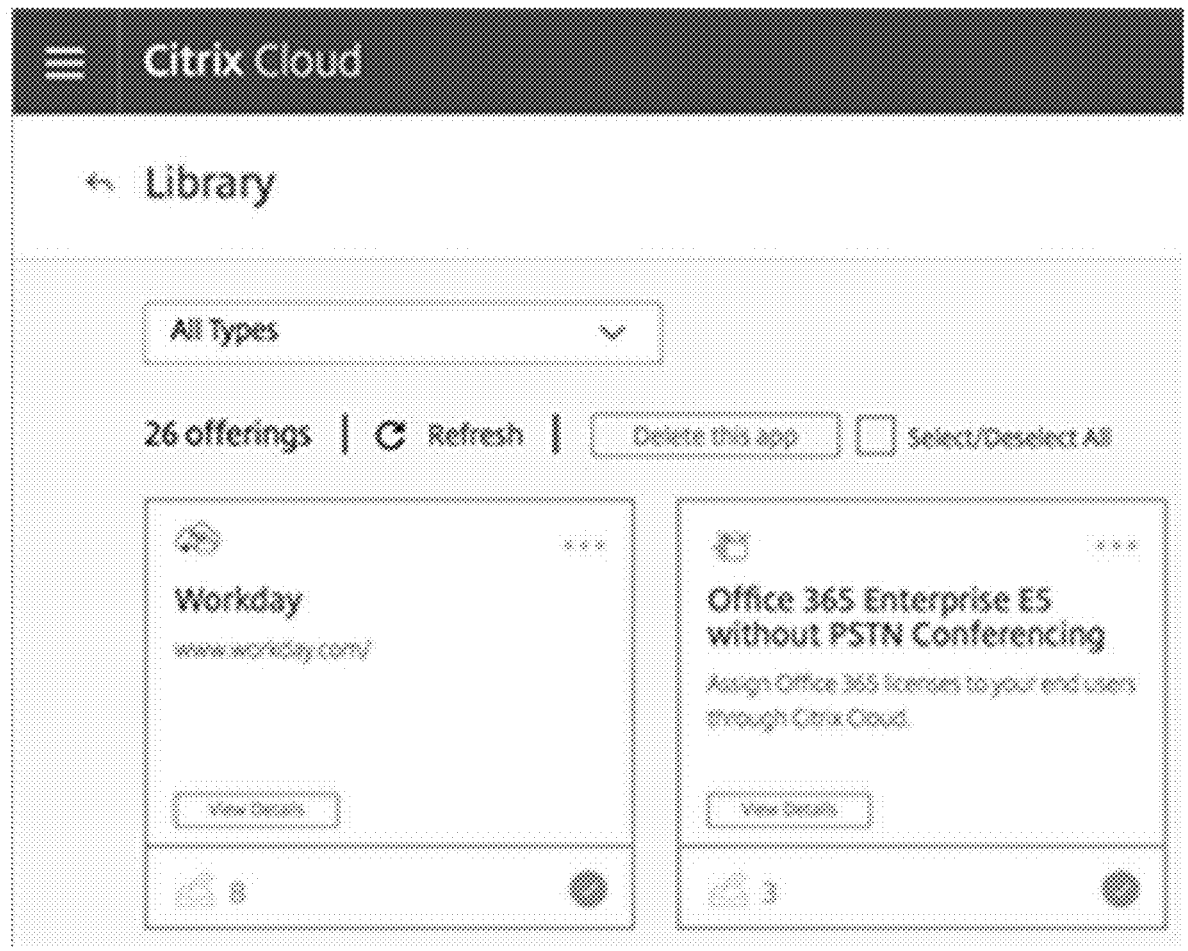
FIG. 3 is an illustration of an illustrative unified view.

At the relaying party server 106 (or alternatively at a client computing device 104), the UI is presented to the individual 102. The UI includes a single unified view in which the individual 102 can initiate the single action, as shown by 210. Accordingly, actions across the objects are unified in the unified view. For example, three of the objects from three disparate cloud services $114_1$-$114_3$ support delete actions (e.g., delete a user). These three delete actions are consolidated into a single delete action which can be initiated by the user. An illustration of an illustrative unified view is provided in FIG. 3.

In 212, the individual performs a user-software interaction for initiating the single action so as to concurrently select a plurality of actions (e.g., the delete actions) supported by at least two cloud services (e.g., cloud services $114_1$-$114_3$) via a widget (e.g., a virtual button) of the single unified view. The widget can be selected via a gesture (e.g., a tap gesture on a touch screen) or via a mouse click.

In response to the user software interaction of 212, the relying party server 106 performs operations in 214 to generate and communicate a single standardized formatted action initiation message for initiating the single action to the central object system 110. In some scenarios, the action initiation message is a Javascript code in a user interface. The code interprets the action type (e.g., API, UINavigate, or UIComponent) and calls different methods to initiate each one. For API type actions, the code renders a confirmation box if necessary and then, if confirmed, calls the API specified by the action. Illustrative code for calling an API action is provided below.

Request (from Central Object System to Resource Provider):
POST https://acme.myservice.com/do/something HTTP/1.1
Authorization: CWSAuth
Bearer=xyz,service=abc
Accept: application/json

```
Content-Type: application/json
X-CC-Locale: en-US
{
    "Offerings": [{
        "ResourceProvider": "MyService",
        "Id": "abc"
    }, {
        "ResourceProvider": "MyService",
        "Id": "123"
    }, {
        "ResourceProvider": "MyService",
        "Id": "456"
    }]
}
Response (from Resource Provider to Central Object System):
HTTP/1.1 200 OK
Content-Type: application/json
{
    "Results": [
        {
            "OfferingId": "abc",
            "StatusCode": 200
        },
        {
            "OfferingId": "123",
            "StatusCode": 404
        },
        {
            "OfferingId": "456",
            "StatusCode": 400,
            "Reason": "Couldn't make it work"
        },
    ]
}
```

If the action is UINavigate, then the Javascript code redirects the browser to the URL specified by the action, with a query parameter indicating the selected object(s), and a query parameter specifying the return URL:
window.location=https://theservice.com/action?offeringId=1&offeringId=2&returnUrl='https://citrix.cloud.com/library'.

If the action is UIComponent, then the Javascript code opens a lightbox on the page and loads the component into the lightbox. At the end of the process, the UI component is simply inserted into the DOM of the browser, inside of the lightbox element. The present solution is not limited to the particulars of the above examples. Notably, only one action initiation message is sent in 214 rather than a plurality of action initiation messages respectively for the actions (e.g., delete a user) common to multiple disparate objects. The central object system 100 forwards the standardized formatted action initiation message to the resource provider system(s) $112_1$-$112_4$ providing the cloud service(s) $114_1$-$114_4$ associated with the objects supporting the particular action (e.g., delete a user), as shown by 216.

In 218, the resource provider system(s) $112_1$-$112_4$ convert(s), transform(s) or translate(s) the standardized protocol format of the action initiation message to a non-standardized protocol format supported by the respective cloud service(s) $114_1$-$114_4$ so as to generate at least one non-standardized formatted action initiation message. An illustrative non-standardized formatted action initiation message is shown below.

Invoke API: https://service1.com/delete(objectidentifier)

The present solution is not limited to the particulars of this example. In 220, the non-standardized action initiation message(s) is(are) provided from the resource provider system(s) $112_1$-$112_4$ to the cloud service(s) $114_1$-$114_4$.

Referring now to FIG. 2B, the process continues with 222 where each object of the cloud service(s) $114_1$-$114_3$ performs the action (e.g., a delete action) in response to the non-standardized formatted action initiation message. Upon completion of the actions, the cloud services $114_1$-$114_3$ communicate non-standardized formatted return message(s) to the resource provider systems $112_1$-$112_3$, as shown by 224. In some scenarios, the non-standardized formatted return message comprises an SQL statement. The present solution is not limited to the particulars of this example. In 224, this message is communicated to the resource provider system(s) $112_1$-$112_4$.

In 226, the resource provider system(s) $112_1$-$112_4$ convert(s), transform(s) or translate(s) the non-standardized protocol format of the non-standardized return messages to the standardized protocol format so as to generate a standardized return message. The standardized return message depends on the action type. In some scenarios, the return message is a standard "status 200" response for API actions. For UINavigate actions, the action signal's completion is achieved by redirecting the browser back to the return URL. For UIComponent actions, the action signal's completion is achieved by invoking a Javascript callback function. The present solution is not limited to the particulars of these examples. The standardized return message(s) is(are) then communicated from the resource provider systems $112_1$-$112_4$ to the central object system 106, as shown by 228. In turn, the central object system 106 passes the standardized return messages to the relying party server 106.

There are multiple ways to invoke an action to be performed by a cloud service. For example, simple actions (e.g., delete actions) which do not require any user input are handled through API calls, while complex actions (e.g., provision capacity actions) that do require user input are handled through custom User Interfaces ("UI") configured to receive the necessary user inputs. The custom UIs facilitate interactions between the custom UIs and the respective cloud services in order to complete the complex actions. Different modes are supported by system 100 for providing access to the custom UIs. In a first mode, a web browser is re-directed to load the custom UIs from a resource provider system (e.g., a server). Alternatively, the custom UIs are loaded inside of the web browser or other base UI.

Figure 4:
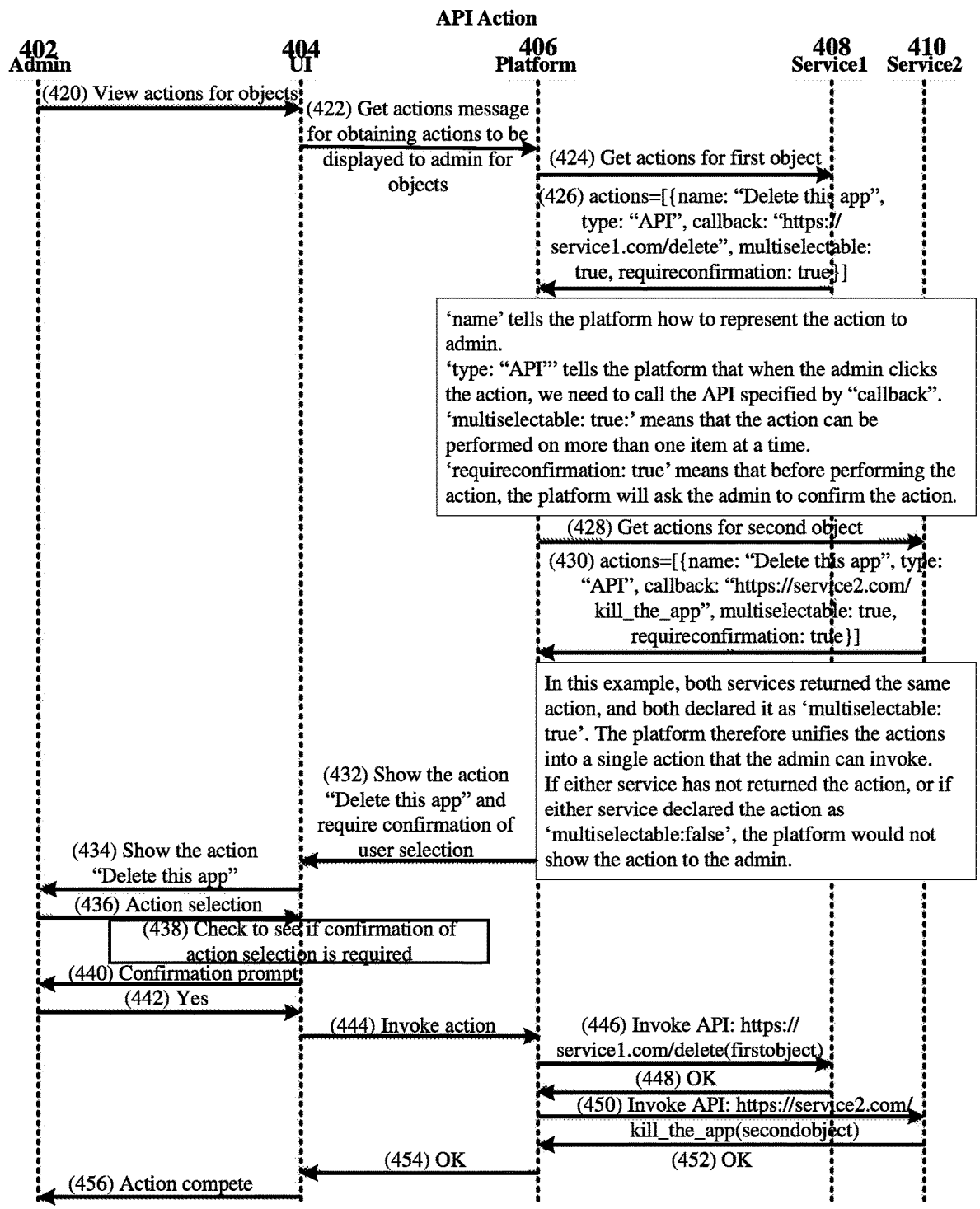
FIG. 4 is an illustration of an illustrative message flow that is useful for understanding how an API action is handled in a system.

Referring now to FIG. 4, there is provided an illustration of an illustrative message flow that is useful for understanding how an API action is handled in a system (e.g., system 100 of FIG. 1) in accordance with the present solution. In API action scenarios, the cloud services (e.g., cloud services $114_1$-$114_4$ of FIG. 1) do not provide specific UIs to show the user when the API action is selected (e.g., via a mouse click). The platform provides a minimalistic, optional UI in the form of a confirmation dialog if requested by a cloud service. API actions include, but are not limited to, delete actions, enable actions, disable actions, save actions, undue actions, refresh actions, and any other action which does not require any further information from the user.

As shown by reference number 420 in FIG. 4, an administrator 402 performs a user-software interaction for viewing actions which can be performed by two objects. The user-software interaction is facilitated by a UI 404 of a computing device (e.g., computing device 104 of FIG. 1). In response to the user-software interaction, the UI 404 causes a get actions message 422 to be sent from the computing device to a platform 406. The platform 406 includes, but is not limited to, a relying party server (e.g., relying party server 106 of FIG. 1), a central object system (e.g., central object system 110 of FIG. 1), and/or resource provider systems (e.g., resource provider systems $112_1$-$112_4$ of FIG. 1). Notably, the get actions message is in a standardized format.

Therefore, the platform 406 converts, transforms or translates the standardized format of the get actions message into the two different non-standardized formats supported by the cloud services 408, 410 providing the two objects.

A first non-standardized get actions message is communicated in 424 from the platform 406 to a cloud service 408. In response to the first non-standardized get actions message, the cloud service 408 performs operations to generate a first response message including information relating to the actions of the first object. The first response message has a non-standardized format as shown in FIG. 4. In some scenarios, the first response message includes various information for each action. This information includes, but is not limited to, an action name, an action type, a callback link, an indication as to whether the action is multiselectable (i.e., can be performed on more than one item at a time), and/or information as to whether confirmation of action selection is required. The action name tells the platform how to represent the action to the administrator. The type tells the platform that when the administrator selects the action, the API specified by the callback needs to be called. In 426, the first response message is communicated to the platform 406.

A second non-standardized get actions message is communicated in 428 from the platform 406 to a cloud service 410 providing the second object. In response to the second non-standardized get actions message, the cloud service 410 performs operations to generate a second response message including information relating to the actions of the second object. The second response message has a non-standardized format as shown in FIG. 4. In some scenarios, the second response message includes various information for each action. This information includes, but is not limited to, an action name, an action type, a callback link, an indication as to whether the action is multiselectable (i.e., can be performed on more than one item at a time), and/or information as to whether confirmation of action selection is required. The action name tells the platform how to represent the action to the administrator. The type tells the platform that when the administrator selects the action, the API specified by the callback needs to be called. In 430, the second response message is communicated to the platform 406.

In the example shown in FIG. 4, both cloud services 408, 410 returned the same action, and declared the action as "multiselectable:true". The platform 406 therefore unifies the actions into a single action that the administrator 402 can invoke. If either cloud service has not returned the action or if either cloud service declared the action as "multiselectable:false:", the platform would not show the action to the administrator 402.

In 432, the platform 406 communicates with the UI 404 for causing the action (e.g., "Delete this app") to be presented to the user via the UI. The platform 406 also instructs the UI 404 to require confirmation of the user's selection of the action. Notably, the message(s) facilitating the action presentation and selection confirmation are in a standardized format when communicated from the platform 406 to the UI 404.

Figure 5:
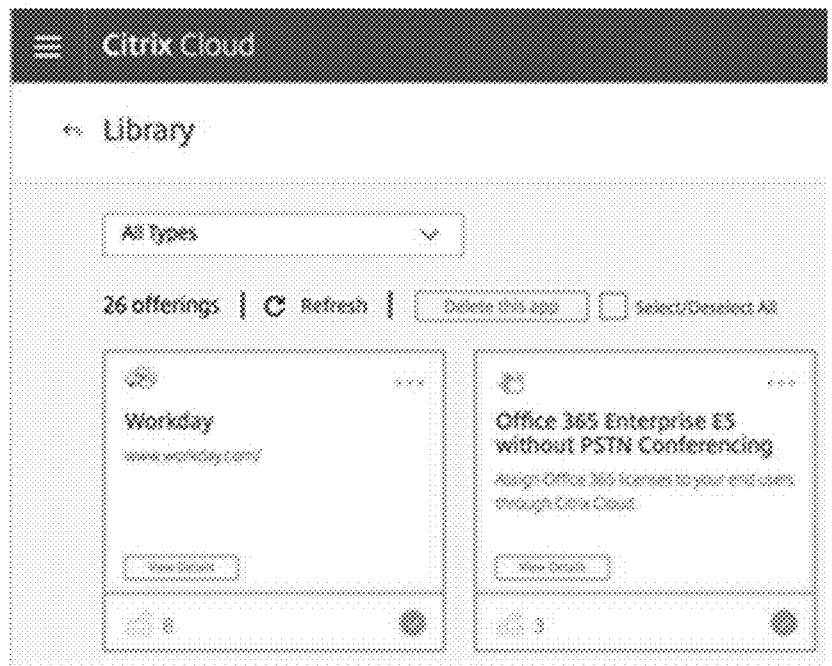
FIG. 5 is an illustration of an illustrative display for allowing an individual to select one or more objects.
Figure 6:
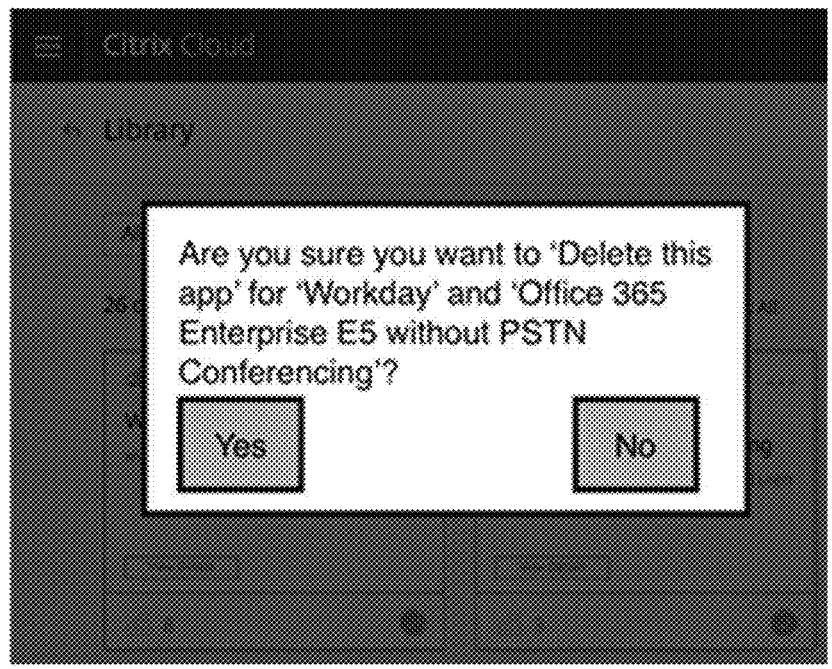
FIG. 6 is an illustration of an illustrative display prompting a user for confirmation of an object selection.

In response to the standardized message, the UI 404 performs operations 434 to show the action to the administrator 402. An illustrative graphical UI ("GUI") in which the action "Delete this app" is presented to a user is provided in FIG. 5. Next in 436, the administrator 402 selects the action. In response to the user selection of the action, the UI 404 determines that the administrator needs to confirm his(her) action selection, as shown by 438. Accordingly in 440, the UI 404 prompts the administrator to provide such confirmation. An illustrative GUI in which the user is prompted to confirm his(her) selection is provided in FIG. 6. As prompted, the administrator provides confirmation in 442 (e.g., by selecting a virtual button with the text "Yes" in the GUI of FIG. 5).

Thereafter, the UI 404 communicates a standardized message to the platform 406 for causing the action to be invoked. In turn, the platform 406 generates two non-standardized messages for causing the action to be invoked by the cloud services 408, 410. The non-standardized messages are then respectively communicated to the cloud services in 446 and 450. Once the actions have been completed, the cloud services 408, 410 communicate an OK message to the platform 406, as shown by 448 and 452. The OK messages are in a non-standardized format. In turn, the platform 406 generates an OK message in a standardized format, and communicates the same to the UI in 454. The UI then notifies the administrator that the action has been completed, as shown by 456.

Figure 7:
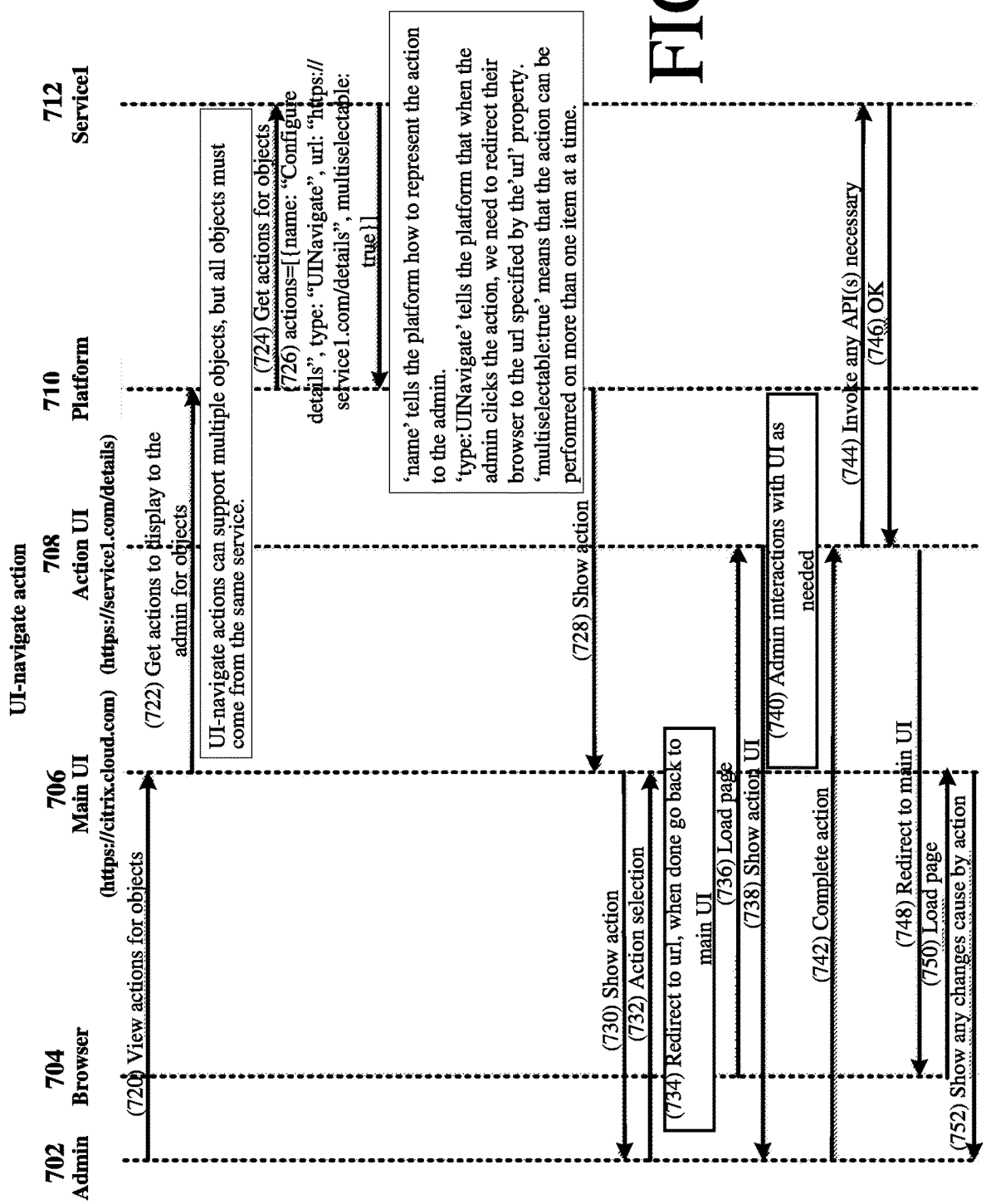
FIG. 7 is an illustration of an illustrative message flow that is useful for understanding how a UI navigate action is handled in a system.

Referring now to FIG. 7, there is provided an illustration of an illustrative message flow that is useful for understanding how a UI navigate action is handled in a system (e.g., system 100 of FIG. 1). In UI navigate action scenarios, a web browser is redirected to a page where an administrator 702 can complete a selected action. When the UI navigate action is completed, the web browser is redirected back to the main UI. UI navigate actions include, but are not limited to, wrap an applications action, property modification actions, data duplication actions, and any other relatively complex action requiring further information from the user.

As shown in FIG. 7, the process begins when the administrator 702 performs a user-software interaction in 720 to view actions for object(s). The user-software interaction is facilitated by a main UI 706 presented within a web browser running on a computing device (e.g., client computing device 104 of FIG. 1). In response to the user-software interaction, the main UI 706 causes a get actions message 722 to be sent from the computing device to a platform 710. The platform 710 includes, but is not limited to, a relying party server (e.g., relying party server 106 of FIG. 1), a central object system (e.g., central object system 110 of FIG. 1), and/or resource provider systems (e.g., resource provider systems 112₁-112₄ of FIG. 1). Notably, the get actions message is in a standardized format. Therefore, the platform 710 converts, transforms or translates the standardized format of the get actions message into a non-standardized format supported by the cloud services 712 providing the objects. Notably, UI-navigate actions can support multiple objects, but all objects must come from the same cloud service.

In 724, the non-standardized get actions message is communicated from the platform to the cloud service 712. In response to the non-standardized get actions message, the cloud service 712 performs operations to generate a response message including information relating to the actions of the objects. The response message has a non-standardized format as shown in FIG. 7. In some scenarios, the response message includes various information for the actions. This information includes, but is not limited to, an action name, an action type, a URL, and/or an indication as to whether the action is multiselectable (i.e., can be performed on more than one item at a time). The action name tells the platform how to represent the action to the administrator. The type tells the platform that when the administrator selects the action, the web browser needs to be redirected to the URL specified by the URL property. In 726, the response message is communicated to the platform 710.

Figure 8:
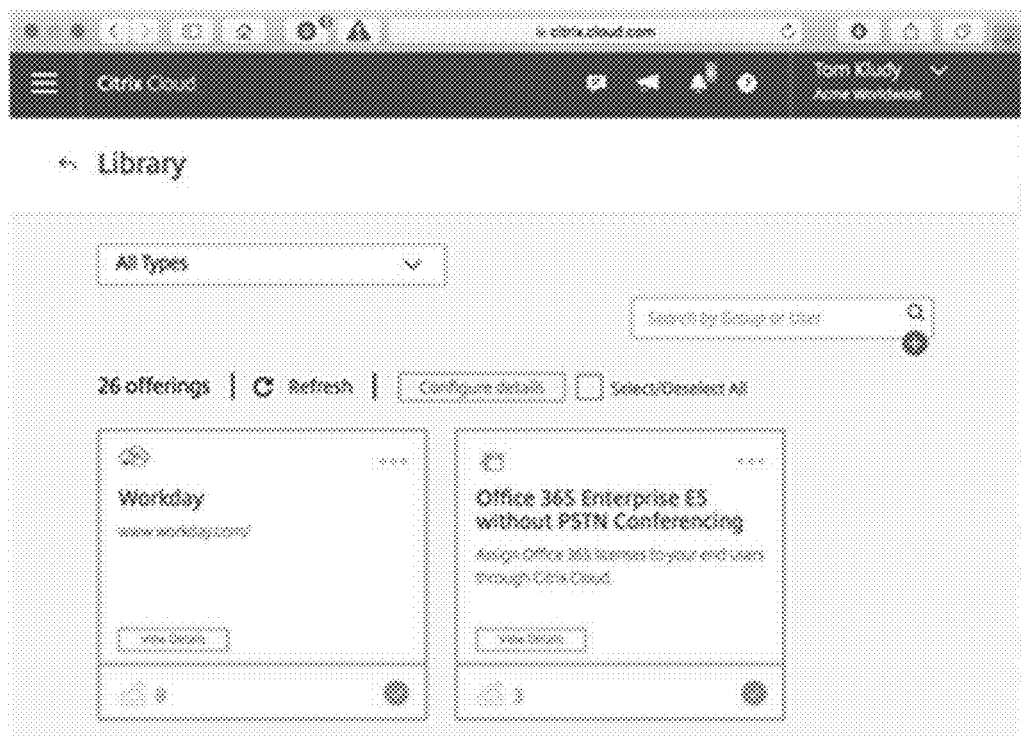
FIG. 8 is an illustration of an illustrative display for allowing an individual to select one or more objects.

In 728, the platform 710 communicates with the main UI 706 for causing the action (e.g., "Configure details") to be presented to the user. Notably, the message facilitating the action presentation is in a standardized format when communicated from the platform 710 to the main UI 706. The main UI 706 then presents the action to the administrator as shown by 730. An illustration of an illustrative main UI showing an action "Configure details" is provided in FIG. 8. In the scenario of FIG. 8, the main UI is "citrix.cloud.com". The present solution is not limited in this regard.

Figure 9:
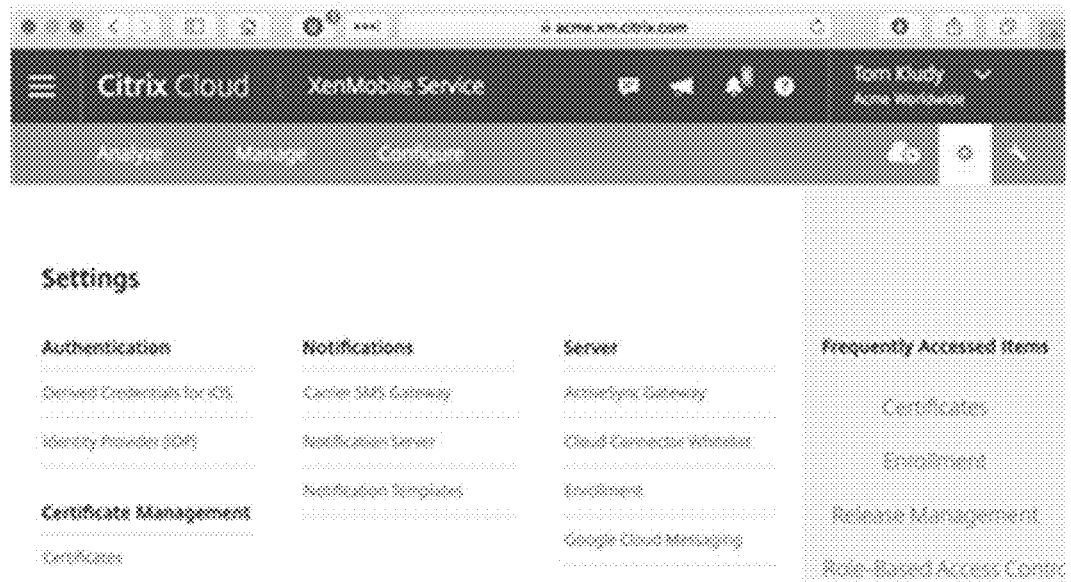
FIG. 9 is an illustration of an exemplary UI that allows an individual to complete an action.

Next in 732, the administrator 702 selects the action. In response to the user selection of the action, the main UI 706 causes the web browser 704 to be redirected to the URL specified in the URL field of the non-standardized message of 726 (e.g., url:https://service1.com/details). The web page accessible via the URL is then loaded in 736. Once the web page has been successfully loaded, the action UI 708 is presented to the administrator 702 via the computing device. The action UI 708 is configured to allow the administrator 702 to complete the action. An illustration of an illustrative action UI is provided in FIG. 9. Notably, the URL where the action UI is launched is different than the URL where the main UI is launched. In the scenario of FIG. 9, "acme.xm-.citrix.com" is the URL where the action UI is launched. The entire page look and feel can change, allowing great flexibility in how complex the action UI can be. The tradeoff is that the administrator may lose the context of what (s)he is doing.

In 740, the administrator 702 interacts with the action UI 708 as needed to complete the action. The administrator performs user-software actions to cause the action to be completed in 742 (e.g., by clicking a "Save" or "Submit" virtual button of the action UI). In response to the user-software interactions, the action is invoked as shown by 744. Once the action has been completed, an OK message is provided to the action UI 708, as shown by 746. 746 can involve: communicating an non-standardized OK message from the cloud service 712 to the platform 710; converting the non-standardized format of the non-standardized OK message to a standardized format; and forwarding the standardized OK message to the action UI 708. In response to the OK message, the action UI 708 performs operations to redirect the web browser 704 back to the main UI. Accordingly, the web browser is redirected to the main UI as shown by 748-750. The main UI is then updated in 752 to show any changes caused by the action's performance.

Figure 10:
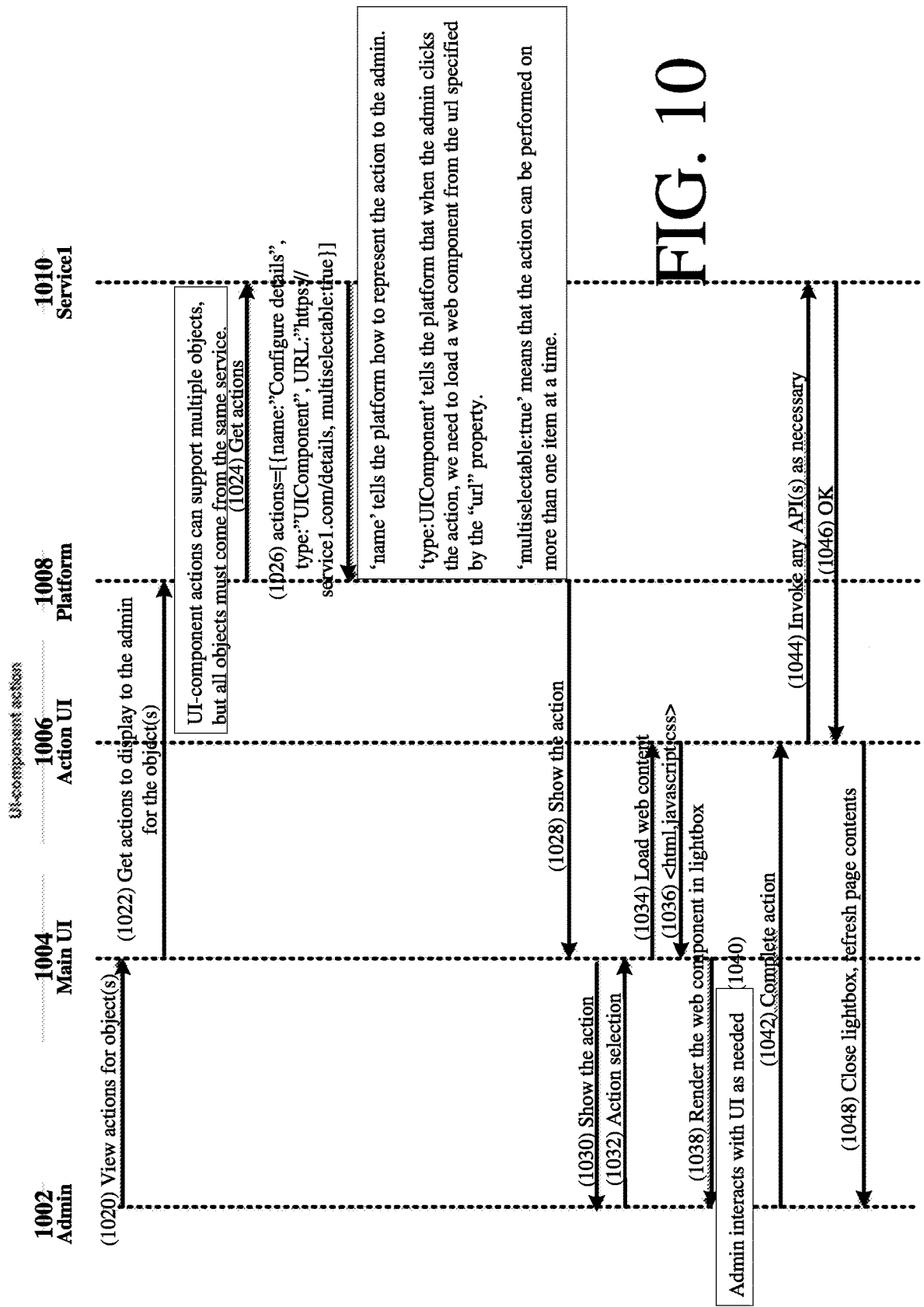
FIG. 10 is an illustration of an illustrative message flow that is useful for understanding how a UI component action is handled in a system.

Referring now to FIG. 10, there is provided an illustration of an illustrative message flow that is useful for understanding how a UI component action is handled in a system (e.g., system 100 of FIG. 1). In the UI component action scenarios, the administrator 1002 invokes the UI component action, loads a web component UI, and displays the loaded web component UI in a lightbox in the context of the web page. The term "lightbox", as used herein, refers to a JavaScript library that displays content by filing the screen, and dimming out the rest of the web page. UI component actions include, but are not limited to, document send to action, object renaming action, user profile edit action, view previous version action, and any other relatively simple action requiring further information from the user.

As shown in FIG. 10, the process begins when the administrator 1002 performs a user-software interaction in 1020 to view actions for object(s). The user-software interaction is facilitated by a main UI 1004 running on a computing device (e.g., client computing device 104 of FIG. 1). In response to the user-software interaction, the main UI 1004 causes a get actions message 1022 to be sent from the computing device to a platform 1008. The platform 1008 includes, but is not limited to, a relying party server (e.g., relying party server 106 of FIG. 1), a central object system (e.g., central object system 110 of FIG. 1), and/or resource provider systems (e.g., resource provider systems $112_1$-$112_4$ of FIG. 1). Notably, the get actions message is in a standardized format. Therefore, the platform 1008 converts, transforms or translates the standardized format of the get actions message into a non-standardized format supported by the cloud services 1010 providing the objects. Notably, UI component actions can support multiple objects, but all objects must come from the same cloud service.

In 1024, the non-standardized get actions message is communicated from the platform 1008 to the cloud service 1010. In response to the non-standardized get actions message, the cloud service 712 performs operations to generate a response message including information relating to the actions of the objects. The response message has a non-standardized format as shown in FIG. 10. In some scenarios, the response message includes various information for the actions. This information includes, but is not limited to, an action name, an action type, a URL, and/or an indication as to whether the action is multiselectable (i.e., can be performed on more than one item at a time). The action name tells the platform how to represent the action to the administrator. The type tells the platform that when the administrator selects the action, a web component from the URL specified in the URL property needs to be loaded. In 1026, the response message is communicated to the platform 1008.

Figure 11:
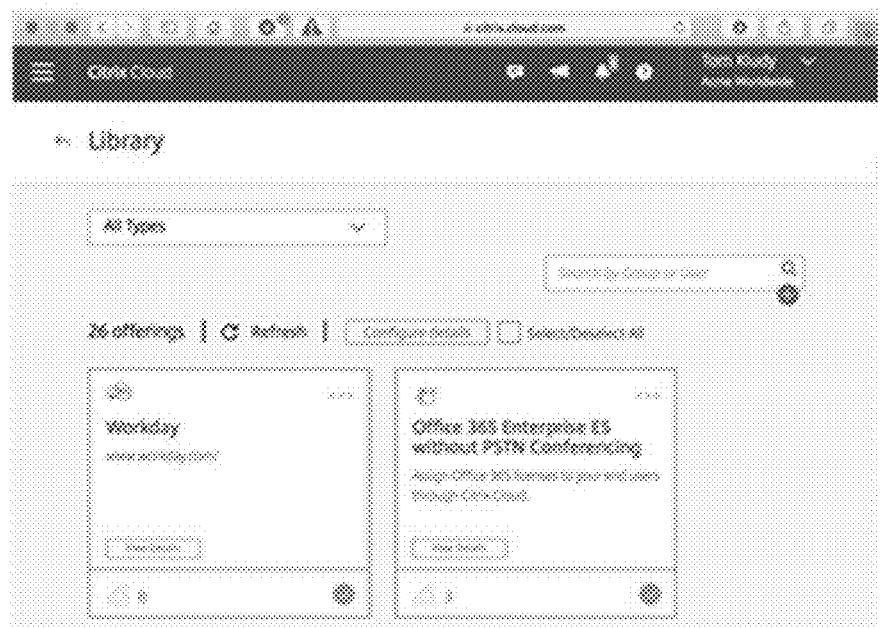
FIG. 11 is an illustration of an illustrative display for allowing an individual to select one or more objects.

In 1028, the platform 1008 communicates with the main UI 1004 for causing the action (e.g., "Configure details") to be presented to the user. Notably, the message facilitating the action presentation is in a standardized format when communicated from the platform 1008 to the main UI 1004. The main UI 1004 then presents the action to the administrator as shown by 1030. An illustration of an illustrative main UI showing an action "Configure details" is provided in FIG. 11. In the scenario of FIG. 11, the main UI is "citrix.cloud.com". The present solution is not limited in this regard.

Figure 12:
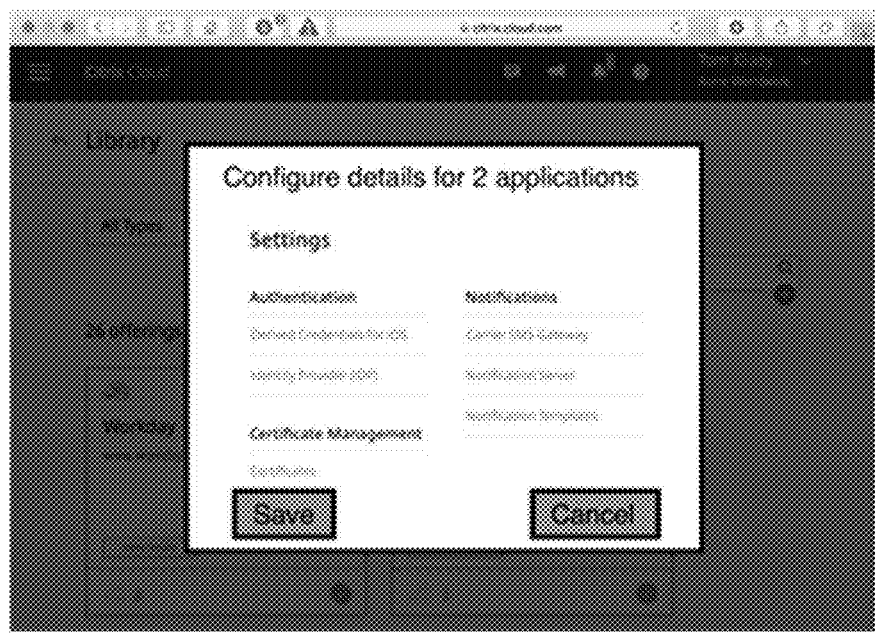
FIG. 12 is an illustration of an exemplary UI that allows an individual to complete an action.

Next in 1032, the administrator 1002 selects the action. In response to the user selection of the action, the main UI 1004 causes an action UI 1006 (or web content UI) to be loaded onto the computing device, as shown by 1034-1036. The action UI 1006 is then displayed in a lightbox, as shown by 1038. An illustration of an illustrative action UI 1006 is provided in FIG. 12. Notably, the URL where the action UI 1006 is launched is the same as the URL where the main UI 1006 is launched (e.g., "citrix.cloud.com"). As such, the administrator 1002 keeps the context of where (s)he was and what (s)he was doing. The tradeoff is that the action UI 1006 that gets loaded is subject to constraints on what it can do. For example, the action UI 1006 cannot be a multi-page wizard.

Subsequently, the administrator 1002 interacts with the action UI 1006 as necessary in 1040. The administrator performs user-software actions to cause the UI component action to be completed in 1042 (e.g., by clicking a "Save" or "Submit" virtual button of the action UI). In response to the user-software interactions, any APIs are invoked as shown by 1044. Once the action has been completed, an OK message is provided to the action UI 1006, as shown by 1046. 1046 can involve: communicating an non-standardized OK message from the cloud service 1010 to the platform 1008; processing the non-standardized OK message; and generating a standardized message to be forwarded from the action UI 1006 to the client computing device being used by the administrator 1002. As shown by 1048, the standardized message includes a command to close the lightbox and a command to refresh page contents to accommodate any changes that were made by the action.

Figure 13:
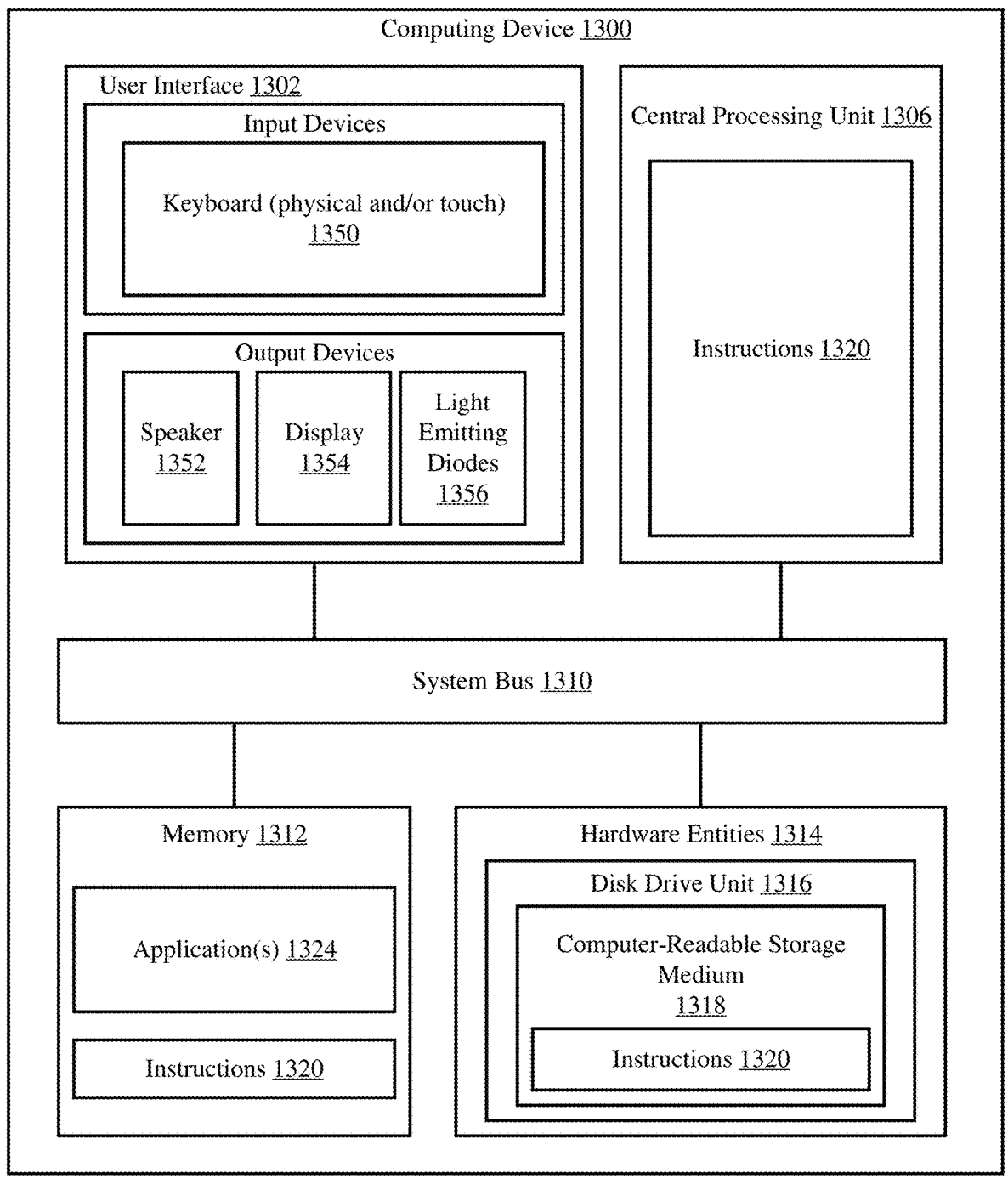
FIG. 13 is an illustration of an illustrative computing device implementing the present solution.

Referring now to FIG. 13, there is provided an illustration of an exemplary architecture for a computing device 1300. Client computing device 104, relying party server 106, central object system 110, and/or resource provider systems $112_1$-$112_4$ of FIG. 1 (is)are the same as or similar to computing device 1300. As such, the discussion of computing device 1300 is sufficient for understanding these components of system 100.

In some scenarios, the present solution is used in a client-server architecture. Accordingly, the computing device architecture shown in FIG. 13 is sufficient for understanding the particulars of client computing devices and servers.

Computing device 1300 may include more or less components than those shown in FIG. 13. However, the components shown are sufficient to disclose an illustrative solution implementing the present solution. The hardware architecture of FIG. 4 represents one implementation of a representative computing device configured to enable normalization of cloud resource interactions for a suite of multi-tenant products across disparate objects and actions coming from different cloud services as described herein. As such, the computing device 1300 of FIG. 13 implements at least a portion of the method(s) described herein.

Some or all the components of the computing device 1300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 13, the computing device 1300 comprises a user interface 1302, a Central Processing Unit ("CPU") 1306, a system bus 1310, a memory 1312 connected to and accessible by other portions of computing device 1300 through system bus 1310, and hardware entities 1314 connected to system bus 1310. The user interface can include input devices and output devices, which facilitate user-software interactions for controlling operations of the computing device 1300. The input devices include, but are not limited, a physical and/or touch keyboard 1350. The input devices can be connected to the computing device 1300 via a wired or wireless connection (e.g., a Bluetooth® connection). The output devices include, but are not limited to, a speaker 1352, a display 1354, and/or light emitting diodes 1356.

At least some of the hardware entities 1314 perform actions involving access to and use of memory 1312, which can be a Radom Access Memory ("RAM"), a disk driver and/or a Compact Disc Read Only Memory ("CD-ROM"). Hardware entities 1314 can include a disk drive unit 1316 comprising a computer-readable storage medium 1318 on which is stored one or more sets of instructions 1320 (e.g., software code) configured to implement one or more of the methodologies, procedures, or functions described herein. The instructions 1320 can also reside, completely or at least partially, within the memory 1312 and/or within the CPU 1306 during execution thereof by the computing device 1300. The memory 1312 and the CPU 1306 also can constitute machine-readable media. The term "machine-readable media", as used here, refers to a single medium or multiple media (e.g., a centralized or distributed database, and/or associated caches and servers) that store the one or more sets of instructions 1320. The term "machine-readable media", as used here, also refers to any medium that is capable of storing, encoding or carrying a set of instructions 1320 for execution by the computing device 1300 and that cause the computing device 1300 to perform any one or more of the methodologies of the present disclosure.

In some scenarios, the hardware entities 1314 include an electronic circuit (e.g., a processor) programmed for facilitating content sharing amongst users. In this regard, it should be understood that the electronic circuit can access and run application(s) 1324 installed on the computing device 1300. The functions of the software application(s) 1324 are apparent from the above discussion of the present solution. For example, the software application is configured to perform one or more of the operations described above in relation to FIGS. 1-12.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for normalizing cloud resource interactions across disparate objects and actions provided by a plurality of different cloud services, comprising:
    obtaining, by a computing device, information that specifically identifies the objects and indicates what actions can be performed for the identified objects, wherein:
        each of the identified objects comprises at least one of a variable, a data structure and a programming function, and
        the actions comprise tasks to be performed by at least one of software and hardware;
    processing, by the computing device, the information to consolidate at least two indicated actions into a single action, wherein each of the at least two indicated actions being consolidated is executable by the identified objects, the identified objects being different from each other and associated with the at least two cloud services of the plurality of different cloud services, and the single action is configured to concurrently select the identified objects and initiate operation of the at least two indicated actions by the identified objects for the at least two cloud services;
    after consolidation of the at least two indicated actions into the single action, causing, by the computing device, a unified view to be presented in a User Interface ("UI") of a client computing device, the unified view allows an initiation of the single action; and
    receiving, by the computing device, a standardized message for initiating the single action in response to a single input received on a user interface of the client computing device, the standardized message being converted into a plurality of message formats actionable by the at two of the different cloud services so that the single input received on the user interface causes the at least two of the different cloud services to perform the single action.

2. The method according to claim 1, wherein the actions are handled through Application Programming Interface ("API") calls.

3. The method according to claim 1, wherein the UI is accessed via a web browser redirect to a resource of a remote system.

4. The method according to claim 1, wherein the UI is loaded inside of a web browser.

5. The method according to claim 1, wherein UI includes a lightbox in which a web component is rendered.

6. The method according to claim 1, wherein the at least two indicated actions are consolidated into a single action when the at least two indicated actions are multiselectable actions.

7. A system, comprising:
a processor; and
a non-transitory computer-readable storage medium comprising programming instructions that are configured to cause the processor to implement a method for normalizing cloud resource interactions across disparate objects and actions provided by a plurality of different cloud services, wherein the programming instructions comprise instructions to:
    obtain information that specifically identifies the objects and indicates what actions can be performed for the identified objects, wherein:
        each of the identified objects comprises at least one of a variable, a data structure and a programming function, and
        the actions comprise tasks to be performed by at least one of software and hardware;
    process the information to consolidate at least two indicated actions into a single action, wherein each of the at least two indicated actions being consolidated is executable by the identified objects, the identified objects being different from each other and associated with the at least two cloud services of the plurality of different cloud services, and the single action is configured to concurrently select the identified objects and initiate operation of the at least two indicated actions by the identified objects for the at least two cloud services;
    after consolidation of the at least two indicated actions into the single action, a unified view to be presented in a User Interface ("UI") of a client computing device, the unified view allows an initiation of the single action whereby the at least two actions;
    receive a standardized message for initiating the single action in response to a single input received on a user interface of the client computing device, the standardized message being convertible into a plurality of message formats actionable by the at least two of the different cloud services so that a single input received on the user interface causes the at least two of the different cloud services to perform the single action.

8. The system according to claim 7, wherein the actions are handled through Application Programming Interface ("API") calls.

9. The system according to claim 7, wherein the UI is accessed via a web browser redirect to a resource of a remote system.

10. The system according to claim 7, wherein the UI is loaded inside of a web browser.

11. The system according to claim 7, wherein UI includes a lightbox in which a web component is rendered.

12. The system according to claim 7, wherein the at least two indicated actions are consolidated into a single action when the at least two indicated actions are multiselectable actions.

* * * * *